P. O. KARTRUDE.
HARVESTER.
APPLICATION FILED MAY 12, 1908.
932,291.
Patented Aug. 24, 1909.
5 SHEETS—SHEET 4.
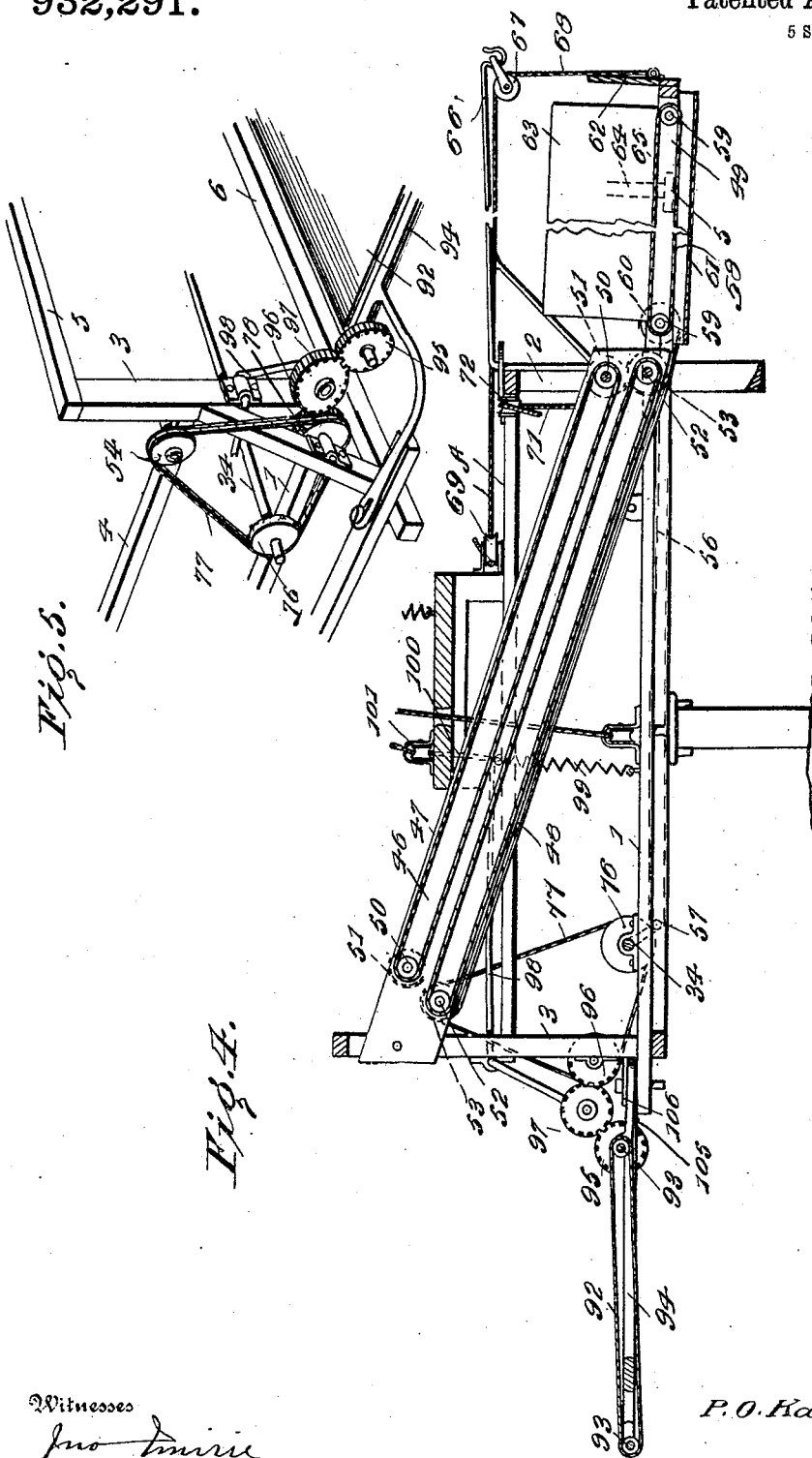
Witnesses
Inventor
P. O. Kartrude
By
Attorneys P. O. KARTRUDE.
HARVESTER.
APPLICATION FILED MAY 12, 1908.
932,291.
Patented Aug. 24, 1909.
5 SHEETS—SHEET 5.
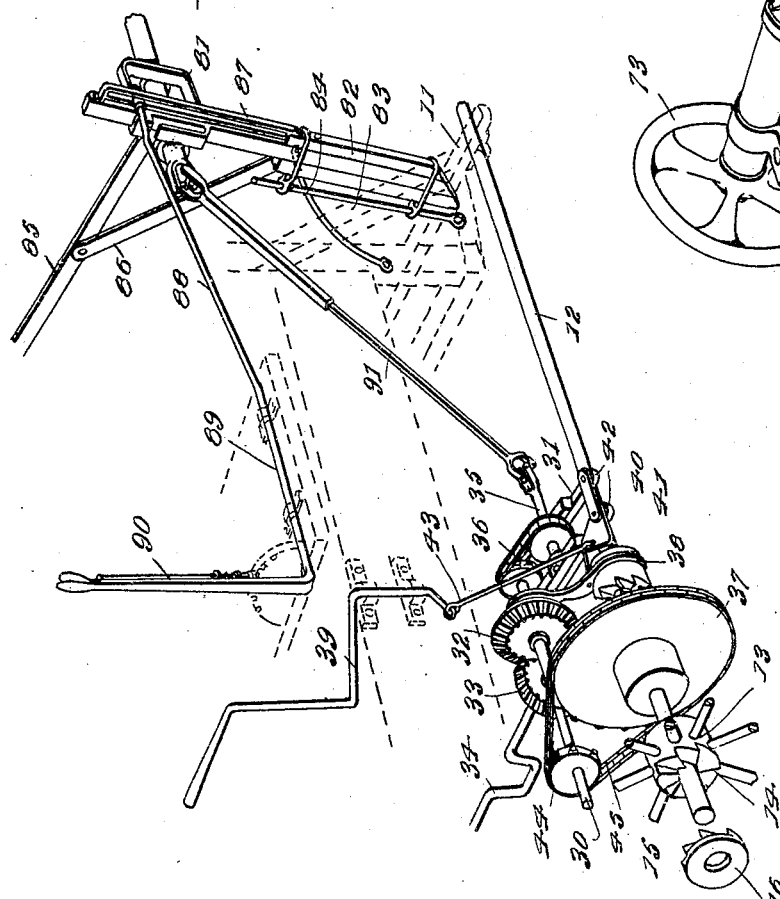

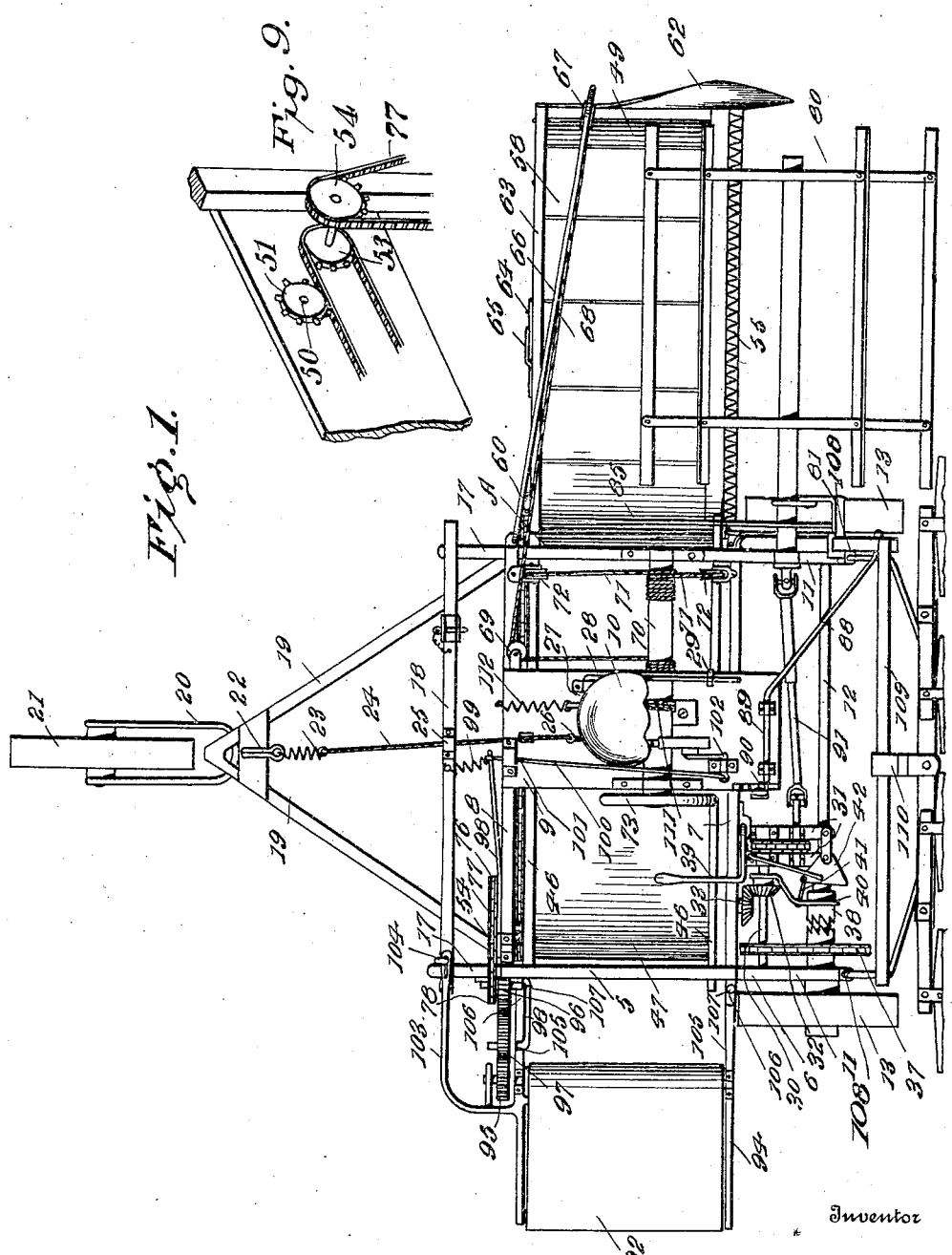

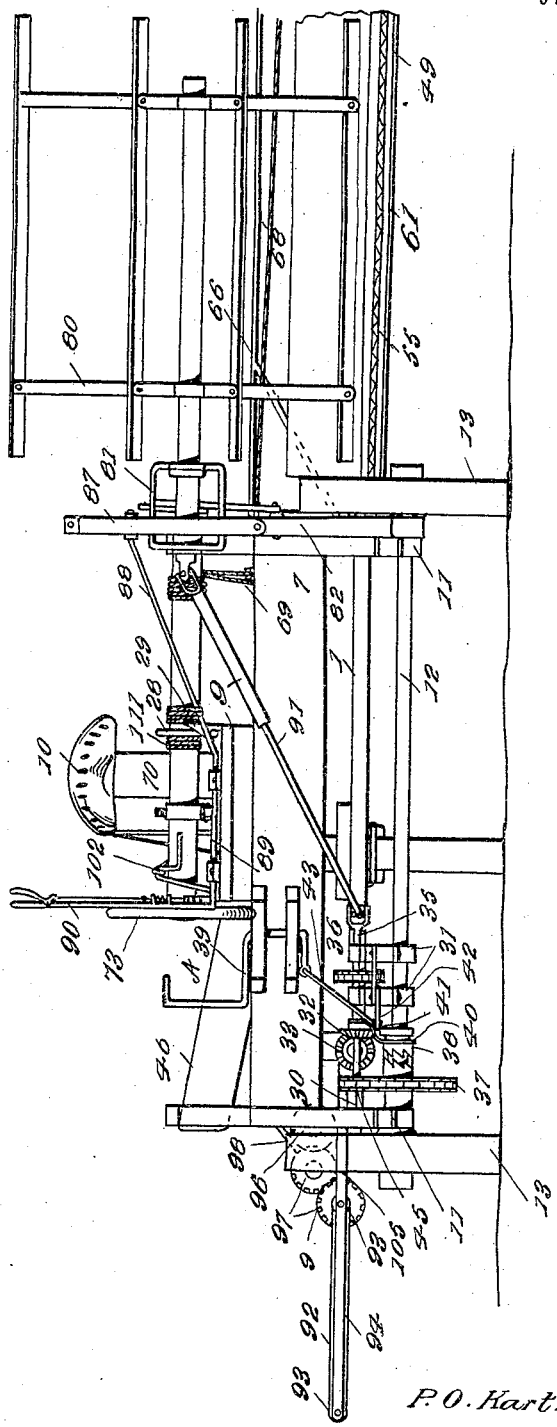

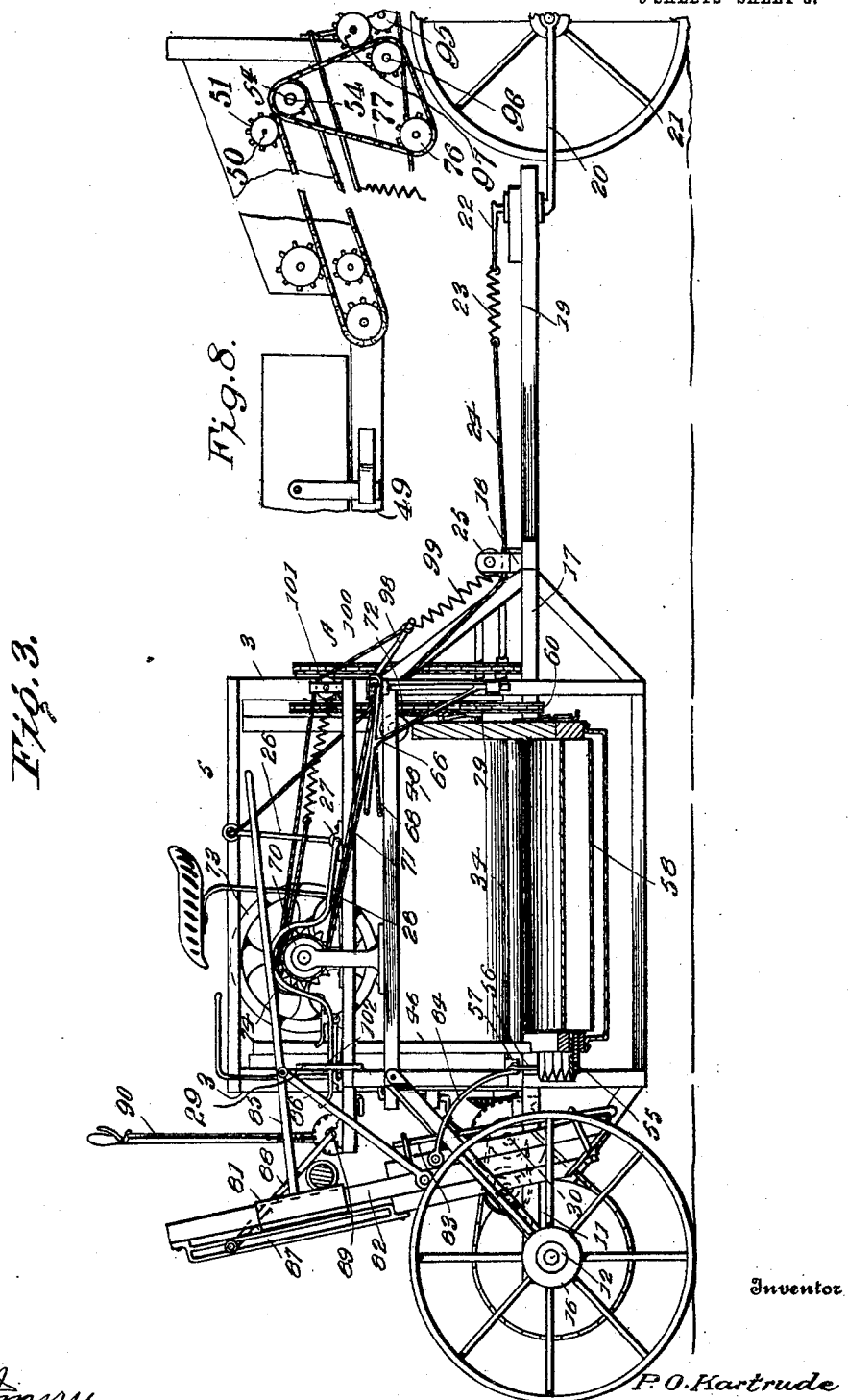

UNITED STATES PATENT OFFICE.

PETER O. KARTRUDE, OF LUVERNE, MINNESOTA.

HARVESTER.

932,291.  Specification of Letters Patent.  Patented Aug. 24, 1909.

Application filed May 12, 1908. Serial No. 432,445.

*To all whom it may concern:*

Be it known that I, PETER O. KARTRUDE, citizen of the United States, residing at Luverne, in the county of Rock and State of Minnesota, have invented certain new and useful Improvements in Harvesters, of which the following is a specification.

The present invention relates to improvements in harvesting machines of that type which are employed in connection with a binder and operate automatically to cut the grain and deliver it to the binder, and the object of the invention is the provision of a harvester which embodies a novel construction whereby all objectionable side draft is eliminated.

The invention further contemplates a novel manner of mounting the grain platform whereby the latter may be raised or lowered as required and always held in proper relation to the elevator.

The machine also embodies an improved manner of mounting the reel which admits of the same being adjusted both vertically and laterally with respect to the platform and also causes the reel to be automatically raised and lowered when the platform is vertically adjusted.

For a full understanding of the invention and the merits thereof and also to acquire a knowledge of the details of construction and the means for effecting the result, reference is to be had to the following description and accompanying drawings, in which:

Figure 1 is a top plan view of a harvester constructed in accordance with the invention. Fig. 2 is a front view of the same. Fig. 3 is an end view of the harvester, portions being broken away. Fig. 4 is a sectional view through the main elevator and platform, portions being removed. Fig. 5 is a detail view of the gearing for driving the endless belt of the bundle carrier. Fig. 6 is a detail view of the main gearing and the standard upon which the reel is mounted. Fig. 7 is a detail view of the drum upon which the cables are wound for adjusting the elevator frame and the platform. Fig. 8 is a view, partly broken away, of the actuating gearing for the main elevator, the view being taken from the side opposite to that shown in Fig. 4. Fig. 9 is a detail perspective view of a portion of said gearing.

Corresponding and like parts are referred to in the following description and indicated in all the views of the drawings by the same reference characters.

Referring to the drawings, the letter A designates the main frame of the harvester upon which the elevator and binding mechanisms together with the gearing for actuating the same are mounted. Specifically describing this main frame it will be observed that the same comprises a pair of transversely disposed sills 1 located at the front and rear of the frame, one end of each of the sills being connected to an intermediate point in the length of an upright 2 while the opposite end is connected to the lower end of an upright 3. The corresponding extremities of the uprights 2 at one side of the main frame are joined by the longitudinal beams 4 and in a similar manner the upper ends of the uprights 3 at the opposite side of the main frame are connected by a longitudinal beam 5 while the lower ends of the said uprights are connected by a second longitudinal beam 6. The corresponding uprights 2 and 3 at the front and rear of the frame respectively are connected by the transverse bars 7 and 8 and these transverse bars support a platform 9 which is located at the top of the main frame and has the seat 10 mounted thereon. Projecting forwardly from opposite sides of the main frame are the brackets 11, one of which is constituted by an end of the longitudinal beam 6, and journaled upon these brackets is an axle 12 having the supporting wheels 13 mounted upon opposite ends thereof. The outer ends of the hubs of these wheels are formed with the inclined teeth 14 engaging spring tongues 15 upon plates 16 which are rigid with the axle. When the harvester is advanced forwardly the spring tongues 15 engage the teeth 14 and lock the wheels with the axle, while when the harvester is moved rearwardly the said spring tongues slip over the inclined teeth and permit the wheels to rotate freely upon the axle. The extremities of the forwardly projecting brackets 11 terminate in eyes 108 which are detachably engaged by hook members at opposite ends of a draft bar 109 to which the tongue 110 is attached, the said tongue constituting a means for applying draft to the harvester. Brackets 17 somewhat similar to the brackets 11 project rearwardly from the frame and are connected by a beam 18 parallel to and slightly spaced from the rear transverse sill 1. A pair of rearwardly converging beams 19 project from these brackets 17 and are provided at their extremity with a yoke 20 which is mounted to swing about a vertical axis, a wheel 21 being journaled between the arms of the yoke so as to support the rear portion of the frame and act as a rudder to guide the frame in its forward movement. An arm 22 projects forwardly from the body portion of the yoke 20 and is connected to a spring 23 which in turn is connected to a cable 24 which passes around a pulley 25 upon the beam 18 and then extends upwardly through the platform 9 where it is connected to an arm 26 rigid with a shaft 27 which is controlled by a lever 28. When this lever is swung upwardly the cable 24 hangs loose and releases the tension in the spring 23 so that the yoke can swing freely about its axis. However, when the lever 28 is swung downwardly into engagement with a catch 29 upon the platform tension is produced in the cable 24 and spring 23 and the yoke 20 is held yieldingly in position so as to prevent side draft upon the machine.

A main shaft 30 which is parallel to and slightly spaced from the axle 12 is journaled between one of the brackets 11 and a pair of bars 31 projecting forwardly from the front transverse sill 1 and provided with bearings receiving the axle. A gear wheel 32 is rigid with this main shaft 30 and meshes with a pinion 33 upon a countershaft 34 which is arranged at right angles to the main shaft and is journaled upon the two transverse sills 1 of the frame. A second countershaft 35 which is journaled upon the bars 31 and is parallel to the main shaft is designed to receive motion from the latter through the medium of a chain and sprocket connection 36. This second countershaft as will be hereinafter described serves to transmit motion to the reel of the harvester while the first mentioned countershaft 34 serves to transmit motion to the elevator and binding mechanisms. A sprocket wheel 37 is loose upon the axle 12 and is adapted to be locked therewith by means of a clutch member 38 which is controlled by a lever 39 mounted upon the main frame. A spring 40 operates normally to move the clutch member into engagement with the wheel 37 and a link 41 connects this spring to a swinging plate 42 which is in turn connected to the lever 30 by a link 43. Motion is transmitted from the main sprocket wheel 37 to a sprocket wheel 44 upon the main shaft through the medium of a chain 45 and it will be obvious that when the harvester is advanced across a field the axle 12 will be rotated through the medium of the wheels 13 and will normally transmit motion to the main shaft 30 by means of which the two countershafts are rotated.

Should it be desired however to throw the main shaft out of gear the desired result can be readily accomplished by manipulating the lever 39 and releasing the clutch member 38 from engagement with the main sprocket wheel 37.

The elevator frame is formed with the side boards 46 which have their upper ends pivotally mounted between the two uprights 3 at one side of the harvester while their opposite ends swing freely between the uprights 2 at the other side of the harvester. Mounted between these side boards 46 is an upper elevator belt 47 and a lower elevator belt 48 which coöperate with each other in the usual manner to receive the grain from the platform 49 and deliver it to a binder (not shown) which may be of any conventional construction. The upper elevator belt 47 passes around the two rollers 50 journaled between the side boards 46 toward opposite ends of the latter and the pivot studs upon which these rollers are mounted extend through the side board of the elevator frame at the rear of the harvester and are provided with the sprocket wheels 51. In a similar manner the lower elevator belt 48 passes around the rollers 52 which are provided with the sprocket wheels 53 corresponding to the sprocket wheels 51 of the rollers 50, the upper roller 52 being also provided with a second sprocket wheel 54. The platform 49 which projects upon one side of the main frame of the harvester in the usual manner is pivoted to the swinging end of the elevator frame and is provided along its forward edge with the usual cutter bar 55. A reciprocating motion is imparted to this cutter bar through the medium of a pitman 56 which extends transversely across the frame of the harvester and is connected to a crank portion 57 of the countershaft 34. An endless belt 58 is mounted upon the platform 49 and serves in the usual manner to receive the grain and deliver it to the elevator belts 47 and 48. This endless belt 58 passes around the rollers 59, the inner roller being provided at the rear of the platform with a sprocket wheel 60. For the purpose of protecting the lower reach of the endless belt 58 against injury a casing 61 is applied to the bottom of the platform and serves to prevent projections from coming into contact with the belt as the machine is drawn across a field. A guard member 62 is located at the outer end of the platform and a second guard member 63 extends along the rear edge of the platform. This guard 63 is preferably hinged to the platform so as to swing inwardly against the conveyer belt when not in use and is held in an operative position by means of a swinging lever 64 which is adapted to engage a keeper 65 upon the frame of the platform.

A bracket 66 which is pivoted to the rear corner of the main frame of the harvester so as to swing about a vertical axis projects over the grain platform 49 and terminates in a hook which engages a pulley 67. Passing around this pulley and connected to the outer end of the grain platform is a cable 68, the opposite end of the cable passing around a pulley 69 upon the frame of the harvester and being connected to a drum 70 which is journaled between bearings projecting respectively from the platform 9 and the upper longitudinal beam 4. In a somewhat similar manner cables 71 are connected to the side boards 46 of the elevator frame and extend upwardly around pulleys 72, the extremities of the cables being also connected to the drum 70. It will thus be obvious that by rotating this drum the two cables 71 and the cable 68 may be taken in or let out simultaneously and the grain platform either raised or lowered as required, the elevator frame being moved a corresponding amount and the conveyer belt upon the platform and the elevator belts always retained in proper relative position. For the purpose of counteracting the weight of the grain platform and the elevator frame so that the said members may be readily adjusted by the application of a comparatively small amount of force a cable 111 is connected to the drum, the said cable being in turn connected to a spring 112 and having a tendency to rotate the drum so as to take in the cables 69 and 71. A hand wheel 73 is applied to the drum 70 for turning the same and a pawl 74 engages a ratchet wheel 75 upon the drum to lock the latter member against rotation. In the present instance this pawl is mounted upon the platform 9 so as to be readily manipulated by the foot of an operator upon the seat 10.

The rear end of the countershaft 34 is provided with a sprocket wheel 76 engaging a chain 77 which also passes around the second sprocket wheel 54 upon the upper roller of the lower elevator belt and a sprocket wheel 78 which is journaled upon the rear upright 3. It will thus be obvious that when the countershaft 35 is rotated motion will be imparted to the roller 52 and the lower elevator belt 48 will be driven in the usual manner. A chain 79 passes around the inner sprocket wheel 53 of the upper roller 52 and also around the sprocket wheel 60 upon the inner roller 59 of the conveyer belt carried by the grain platform. This chain 79 also engages the two sprocket wheels 51 so as to actuate the upper elevator belt and the sprocket wheel 53 upon the lower roller 52 of the lower elevator belt.

The reel 80 which may be of any conventional construction is journaled upon a bracket 81 which is slidably mounted upon a standard 82 carried by a swinging arm 83 which is pivoted to the lower portion of the main frame at one side thereof. It will also be observed that the standard 82 is slidably mounted upon the swinging arm 83 so as to move longitudinally thereon and is connected by an arm 84 with the swinging end of the elevator frame so that the standard and grain platform will move in unison. However, by sliding the bracket 81 upon the standard the reel can be vertically adjusted independently of the grain platform and for the purpose of manipulating this bracket a lever 85 is utilized, the said lever being pivotally connected at one end to the bracket and at an intermediate point to an arm 86 which is loosely connected to the standard. Extending along the front of the standard 82 is a slotted guide 87 loosely receiving a crank arm 88 projecting from a shaft 89 journaled upon the front of the platform 9. A lever 90 is provided for turning this shaft 89 and for swinging the crank arm 88 to move the reel either to the front or to the rear as required. It will thus be obvious that while the reel is so mounted as to be automatically raised and lowered simultaneously with the grain platform, nevertheless the reel may be adjusted both vertically and laterally independently of the grain platform. As pretion from the second countershaft 35, the inner end of the reel shaft being connected by a universal joint to one end of an inclined shaft 91 the opposite end of which is connected by a similar joint to the second countershaft 35. This inclined shaft 91 is composed of two telescoping sections and may be elongated or shortened as the standard 82 is moved longitudinally upon the swinging arm 83 or the bracket 81 is slid up and down upon the standard.

As the harvester machine is drawn across the field the grain is cut by the cutter bar 55 and forced upon the conveyer belt 58 of the grain platform by means of the reel 80. The conveyer belt delivers the grain to the elevator belts 47 and 48 which carry it to a binder mechanism (not shown) which may be of any approved construction and is mounted upon the main frame so as to be actuated by the countershaft 34. The sheaves of grain after being acted upon by the binder are deposited upon the endless belt 92 of a bundle carrier which is applied to the harvester in such a manner that it can be swung rearwardly into an inoperative position should it be desired to dispense with the same. This endless belt 92 passes around the rollers 93 journaled upon the bundle carrier frame 94, the inner roller being provided with a gear wheel 95 which when the bundle carrier is in operative position is designed to receive motion from a gear wheel 96 rigid with the sprocket wheel 76 through the medium of a gear wheel 97. This gear wheel 97 is mounted so as to be swung either into or out of operative position, being carried by a lever 98 which is pivotally mounted at an intermediate point in its length upon the frame. The free end of this lever projects inwardly to approximately the central portion of the main frame and is connected with a spring 99 which normally tends to move the lever so as to throw the gear wheel 97 into an inoperative position. A cable 100 is also connected to the free end of this lever and extends around a pulley 101 upon the platform to a foot lever 102 which is located immediately in front of the seat 10. When it is desired to drive the bundle carrier belt 92 it is merely necessary to push upon the foot lever 102 so as to swing the lever 98 against the action of the spring 99 and throw the gear wheel 97 into mesh with the two gear wheels 95 and 96. As soon as the pressure upon the foot lever is released the spring 99 will again draw the free end of the lever 98 downward and the gear wheel 97 will be moved into an inoperative position.

The bundle carrier frame 94 is formed with a rearwardly and inwardly extending arm 103 having the extremity thereof pivotally connected to the transverse beam 18 at the rear of the main frame as indicated at 104 so that when the said bundle carrier frame has been disengaged from the side of the harvester it could be swung rearwardly into an out-of-the-way position. For the purpose of retaining the bundle carrier frame 94 in operative position the same is provided with the extensions 105 terminating in eyes which are received between the upper faces of the transverse sills 1 and plates 106 slightly spaced therefrom, the said eyes being engaged by the removable pins 107. It will thus be apparent that while these pins 107 are in position the bundle carrier frame will be held in a secure engagement with the side of the harvester frame while when these pins are removed the bundle carrier may be swung rearwardly about the pivot 104 of the arm 103 so as to be held in an out-of-the-way and inoperative position.

Having thus described the invention, what is claimed as new is:

1. A harvester comprising a main frame, a swinging elevator frame mounted upon the main frame, an elevator mounted upon the elevator frame, and a grain platform connected at one end to the elevator frame and supported at its opposite end by the main frame.

2. A harvester comprising a main frame, a swinging elevator frame mounted upon the main frame, an elevator mounted upon the elevator frame, and a grain platform pivotally connected at one end to the elevator frame and adjustably supported at its opposite end by the main frame.

3. A harvester comprising a main frame, a swinging elevator frame mounted upon the main frame, an elevator mounted upon the elevator frame, a grain platform pivotally connected at one end to the elevator frame and adjustably connected at its opposite end to the main frame, and means for simultaneously adjusting the elevator frame and grain platform.

4. A harvester comprising a main frame, a grain platform carried by the main frame, means for vertically adjusting the grain platform, a swinging arm upon the main frame, a standard movable longitudinally upon the swinging arm, a reel mounted upon the standard, and connecting means between the standard and the grain platform.

5. A harvester comprising a main frame, a grain platform carried by the main frame, means for vertically adjusting the grain platform, a swinging arm upon the main frame, a standard movable longitudinally upon the swinging arm, connecting means between the standard and the grain platform, a bracket slidably mounted upon the standard, and a reel journaled upon the bracket.

6. A harvester comprising a main frame, a grain platform mounted upon the main frame, means for vertically adjusting the grain platform, a swinging arm upon the main frame, a standard movable longitudinally upon the swinging arm, connecting means between the standard and the grain platform, a reel carried by the standard, a guide upon the standard, and a crank arm coöperating with the guide to move the reel forwardly or rearwardly.

7. A harvester comprising a main frame, a grain platform mounted upon the main frame, means for vertically adjusting the grain platform, a swinging arm upon the main frame, a standard movable longitudinally upon the swinging arm, connecting means between the standard and the grain platform, a bracket slidably mounted upon the standard, a reel journaled upon the bracket, a slotted guide upon the standard, and a crank arm journaled upon the main frame and coöperating with the slotted guide to swing the standard.

8. A harvester comprising a main frame, a grain platform mounted upon the main frame, a swinging arm, a standard movable longitudinally upon the swinging arm, connecting means between the standard and the grain platform, a bracket slidable upon the standard, a reel journaled upon the bracket, a lever pivotally connected to the bracket, and a link pivotally connected to the lever and the standard to admit of the bracket being moved through the medium of the lever.

9. A harvester comprising a main frame, a swinging elevator frame mounted upon the main frame, an elevator mounted upon the elevator frame, a grain platform pivotally connected at one end to the elevator frame and supported by the main frame at its opposite end, means for adjusting the grain platform and elevator frame, a reel movable up and down with the grain platform, means for vertically adjusting the reel independently of the grain platform, and means for moving the reel forwardly or rearwardly.

10. A harvester comprising a main frame, a swinging elevator frame mounted upon the main frame, an elevator mounted upon the elevator frame, a grain platform pivotally connected at one end to the elevator frame, a bracket projecting from the main frame over the grain platform, a guide member upon the bracket, a drum mounted upon the main frame, a cable connected to the drum and free end of the grain platform and extending over the guide member, and a second cable connecting the drum and the elevator frame.

11. A harvester comprising a main frame, a swinging elevator frame carried by the main frame, an elevator mounted upon the elevator frame, a grain platform pivoted at one end to the elevator frame, a drum mounted upon the main frame, cables adapted to be wound upon the drum and having an operative connection with the free end of the grain platform and with the elevator frame respectively, means for rotating the drum, and means for locking the drum against movement.

12. A harvester comprising a main frame, a swinging elevator frame carried by the main frame, an elevator mounted upon the elevator frame, a grain platform pivoted at one end to the elevator frame, a drum mounted upon the main frame, cables adapted to be wound upon the drum and having an operative connection with the free end of the grain platform and with the elevator frame respectively, a wheel applied to the drum for rotating the same, and a pawl and ratchet for locking the drum against movement.

13. A harvester comprising a main frame, a swinging elevator frame carried by the main frame, an elevator mounted upon the elevator frame, a grain platform pivoted to the elevator frame, a drum mounted upon the main frame, cables adapted to be wound upon the drum and having an operative connection with the grain platform and the elevator frame, and a spring coöperating with the drum to counteract the weight of the elevator frame and grain platform.

14. A harvester, comprising a main frame, a swinging elevator frame mounted upon the main frame, an elevator upon the elevator frame, a grain platform pivotally connected at one end to the elevator frame, a bracket projecting over the grain platform, a guiding member upon the bracket, and a cable connected to the grain platform, and passing over said guide member for raising and lowering said grain platform.

15. A harvester comprising a main frame, an elevator mounted upon the main frame, a bundle carrier frame pivotally connected to the main frame so as to be swung either into or out of an operative position, means upon one of the edges of the bundle carrier frame for engaging the main frame to hold it in an operative position, and a conveyer mounted upon the bundle carrier frame for receiving the grain from the elevator.

16. A harvester comprising a main frame, an elevator mounted upon the main frame, a bundle carrier frame provided at one corner with an arm which is pivotally connected to the harvester frame, so as to admit of the bundle carrier frame being swung either into or out of operative position, extensions upon one edge of the bundle carrier frame for engaging the harvester frame to hold it in operative position, and a conveyer mounted upon the bundle carrier frame adapted to receive the grain from the elevator.

In testimony whereof I affix my signature in presence of two witnesses.

PETER O. KARTRUDE. [L. S.]

Witnesses:
P. O. SKYBERG,
FRED BURLEY.